United States Patent
Sohmers

(10) Patent No.: US 7,852,372 B2
(45) Date of Patent: *Dec. 14, 2010

(54) INTERACTIVE TELEVISION SYSTEM AND METHOD

(75) Inventor: Gary Richard Sohmers, Hudson, MA (US)

(73) Assignee: Gary Sohmers, Hudson, MA (US)

(*) Notice: Subject to any disclaimer, the term of this patent is extended or adjusted under 35 U.S.C. 154(b) by 1393 days.

This patent is subject to a terminal disclaimer.

(21) Appl. No.: 11/098,772

(22) Filed: Apr. 4, 2005

(65) Prior Publication Data

US 2006/0221195 A1 Oct. 5, 2006

(51) Int. Cl.
*H04N 7/18* (2006.01)
*G06K 9/00* (2006.01)

(52) U.S. Cl. .................. 348/150; 382/119

(58) Field of Classification Search .......... 348/207.1, 348/211.11, 460, 571, 386, 393, 588, 143, 348/152, 153, 156, 155, 438, 408, 384, 399; 382/61, 62, 54, 232, 254, 119; 386/95, 49, 386/64, 104, 46, 45, 69, 70, 82, 83, 96, 125, 386/131; 725/105, 80, 78

See application file for complete search history.

(56) References Cited

U.S. PATENT DOCUMENTS

| | | | |
|---|---|---|---|
| 5,448,291 A * | 9/1995 | Wickline | 348/159 |
| 5,600,368 A * | 2/1997 | Matthews, III | 348/143 |
| 6,359,647 B1 * | 3/2002 | Sengupta et al. | 348/154 |
| 7,207,476 B1 * | 4/2007 | Slate | 235/375 |
| 2003/0046543 A1 * | 3/2003 | Houston et al. | 713/176 |
| 2003/0105685 A1 * | 6/2003 | Millikan | 705/30 |
| 2004/0006519 A1 * | 1/2004 | Lee | 705/26 |
| 2004/0054694 A1 * | 3/2004 | Piccionelli et al. | 707/104.1 |
| 2005/0273830 A1 * | 12/2005 | Silver et al. | 725/105 |
| 2008/0109729 A1 * | 5/2008 | Notea et al. | 715/722 |
| 2008/0127251 A1 * | 5/2008 | Wachtfogel et al. | 725/34 |
| 2008/0274808 A1 * | 11/2008 | Walker et al. | 463/31 |

* cited by examiner

Primary Examiner—Behrooz Senfi

(57) ABSTRACT

A system and method for simulating a user's participation at an event. The system and method including providing a virtual queue or line for meeting and obtaining an autograph of a celebrity, attending a live event and/or for purchasing an item. The system and method include providing video and audio content to a remote user device, such as a television or a computer, for display on the monitor. A plurality of video cameras positioned in and around a line for obtaining an autograph provide a respective plurality of video and audio feeds that are broadcast to users of the system. An interface selectively changes the feed shown on the user's device to simulate movement in the line toward the celebrity until the user is able to view the celebrity autograph an item specifically designated for the user. The item can be merchandise, such as a CD, DVD, photograph or poster, selected by the user. The system mails the autographed item to the viewer and can also provide a recording of the autograph session.

37 Claims, 8 Drawing Sheets

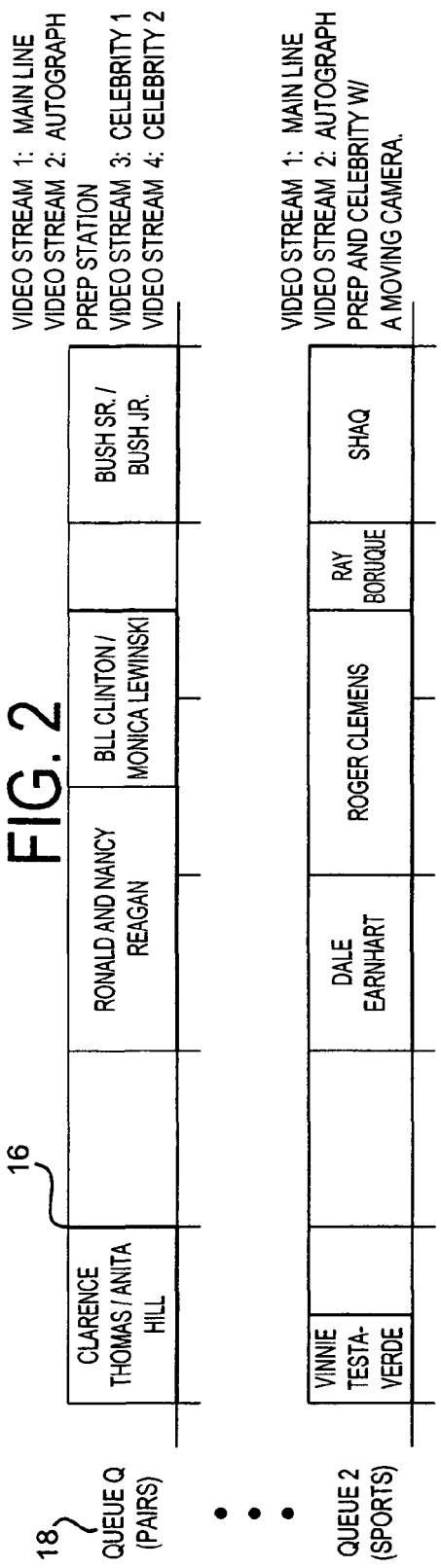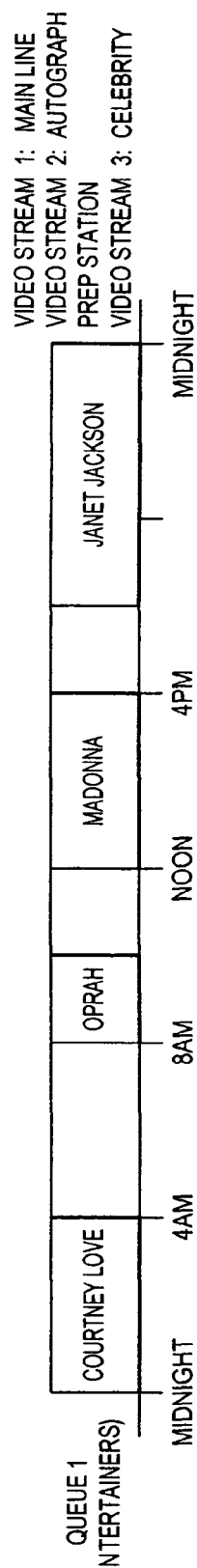
FIG. 2
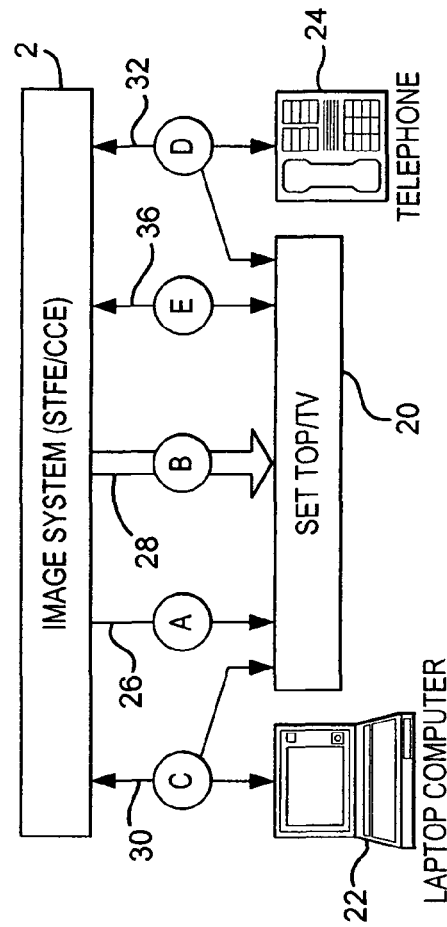
FIG. 3

INTERACTIVE TELEVISION SYSTEM AND METHOD

CROSS-REFERENCE TO RELATED APPLICATIONS

Not applicable.

FEDERALLY SPONSORED RESEARCH OR DEVELOPMENT

Not Applicable.

TECHNICAL FIELD

The present invention generally relates to an interactive environment wherein a remote user can participate or otherwise interact with a live event via the user's television and/or other similar communication devices, and more particularly to an interactive event broadcasting system wherein a user interacts with the system during a live event via a television to purchase an item.

In one form, the present invention relates to an interactive television or computer environment to allow a remote user of the system to meet and obtain an autograph from a celebrity, and more particularly to a television or computer system that utilizes multiple camera signals to simulate or provide a virtual line or queue for meeting a celebrity and obtaining an autograph on paper, a picture or other merchandise from the celebrity.

BACKGROUND OF THE INVENTION

Television signal distribution systems typically broadcast television signals to individual users or subscribers on a plurality of individual television channels. The channels may be modulated onto one or more carrier frequencies within a discernable frequency band. With digital television signals, each discernable frequency band may consist of one or more programs of video, audio, and data content that is digitally encoded.

Typically, a television viewer intentionally and explicitly invokes a tuning action to select a program of choice. This is a conscious decision, based on selecting a specific channel number or a textual description of a channel's content provided in an integrated electronic interactive program guide. This generic content broadcast and viewer content selection paradigm is widely deployed and accepted.

Utilizing this paradigm, it is difficult to create program content where the users feel as if they were an active part of the process. That is, the user's involvement is passive; the user does not have the sensation or illusion of participating in the events displayed on the television, and cannot interact with the any aspect of the event. The user is merely a silent observer.

The present invention is provided to solve the problems discussed above and other problems, and to provide advantages and aspects not provided by prior systems and methods of this type. A full discussion of the features and advantages of the present invention is deferred to the following detailed description, which proceeds with reference to the accompanying drawings.

SUMMARY OF THE INVENTION

The present invention provides a personalized, dynamic viewing experience using more than one video and audio streams transparently and automatically tuned from within a user's television set. The invention utilizes unique viewer rules that identify content types, stream sources, start times and durations, and other discrete synchronous and asynchronous events. The system and method of the present invention can simulate a user's participation at any live event, such as—for example—standing in line to meet a celebrity and obtaining a unique item, such as the celebrity's autograph; purchasing an item of merchandise; or viewing and participating in a live entertainment event.

The system of the present invention utilizes several video and audio sources. These sources are produced wherein each is a separate and distinct program stream suitable for general broadcast to a large population of users viewing the experience via a "receiver." Examples of receivers include a television set working in combination with a cable or satellite set-top, an advanced digital television, or television enabled personal computer.

The system and apparatus described by this invention sends signals in the form of data encapsulated events, or messages, to specific viewers' receivers to switch (or "tune") to alternatively available video/audio streams. The viewer or user of the system does not control this tuning behavior, nor does the viewer know that tuning to an alternative stream has been performed (other than realizing the video being displayed shows a different scene than the previous one). From the viewer's perspective, the serialized, sequential concatenation of the multiple streams provides a seamless viewing experience. The system and apparatus uses well established broadcast structure to implement the unique viewing experience.

According to one embodiment, the present invention provides a system and method utilizing an interactive television or computer environment to allow a user of the system to virtually meet and obtain an autograph from another, such as a celebrity. The system simulates the experience of a real autograph session while allowing the user to have this experience from a remote location (e.g., the user's home). In this regard, the system creates a "virtual line" or "virtual queue" for the user to stand. The system allows the user to select a celebrity from a list of celebrities signing autographs. The system also allows the user to select merchandise to purchase and have autographed while waiting in line and provides instructions or other data while in use.

The system utilizes a plurality of camera feeds or streams (or sometimes referred to as a signal or signals) that are sent to the user's television or computer monitor (the system can also include additional camera and/or voice or data signals sent to the user's telephone or cell phone, PDA, etc.). A plurality of cameras providing the streams are positioned to simulate a virtual queue or line. Each queue is preferably associated with a fixed number of video streams. The system selectively sends the camera streams to the user's television or computer monitor to simulate the user progressing through the line until reaching the celebrity providing an autograph. At the last camera the transaction or interaction occurs, such as a celebrity signing the item purchased by the user and possibly addressing the user and/or answering questions posed by the user. The signed item is then shipped to the user.

In one embodiment of the invention, a system for simulating a queue for meeting and obtaining an autograph from a celebrity viewable from a remote device is disclosed. The system comprises a first camera positioned at a first point of a line providing a first video signal of the line from the first point; a second camera positioned at a second point of the line and providing a second video signal of the line from the second point; and a third camera positioned at a third point of the line and providing a third video signal of the line from a third point. The third signal includes a direct view of the celebrity providing an autograph of an item. The system also includes an interface for broadcasting the first, second and third signals to a remote user device. The interface controls switching between the first, second and third signals to simulate movement in the line toward the celebrity on the user's device. The video signals are preferably sent in real time. This allows the user to interact in the process, such as by identifying an item to be autographed and requesting who the autograph should be made out to while viewing the celebrity.

Preferably, a MPEG-2 data stream is provided with the first, second and third video signals to provide the primary signaling path. However, the system can include other interactive signaling paths, such as a phone modem, DSL, cable modem or cable out-of-band (OOB) signal.

The first, second and third video signals are broadcast in a format receivable by a television set or in a format for receiving by other user devices, such as a computer, PDA, etc.

The interface can further broadcast additional information to the user device. This can include advertisements or promotions relating to the celebrity content.

According to another embodiment, the invention provides a system for simulating participation in a line for obtaining a unique item, such as an autograph of a celebrity, that comprises a plurality of cameras wherein each camera provides a video (and possibly an audio) stream of a line for obtaining an autograph from a celebrity. The system also includes an interface system for broadcasting each video stream to a remote user device and switching among each video stream to simulate movement in the line toward a celebrity on the remote user device.

The interface system is configured to broadcast the video streams via a cable system or via a satellite system. The interface system can also broadcast a data stream with the video (and audio) streams to the remote user device.

According to yet another embodiment of the invention, a method for providing a virtual queue for an experiential event such as meeting and obtaining an autograph of a celebrity is disclosed. The method comprises the steps of providing a first video feed of a first position in a line for obtaining an autograph of a celebrity for viewing on a remote user device, and providing a second video feed of a second position of the line for obtaining an autograph of a celebrity for viewing on the remote user device. The method further includes enabling viewing of the first video feed on the remote viewer device, and, disabling viewing of the first video feed and enabling viewing of the second video feed on the remote user device to simulate movement in the line on the remote user device.

Additional video feeds can be provided to further create the illusion of moving in the line. In this instance, for example, the method can include providing an intermediate video feed of an intermediate position of the line for obtaining an autograph between the first position and the second position, and, enabling viewing of the intermediate video feed after the step of disabling viewing of the first video feed and prior to the step of enabling viewing of the second video feed. Further intermediate feeds can be added in a like manner.

Preferably, the method is interactive and includes the step of receiving input from the remote user device identifying a first item from a plurality of available items to have autographed by the celebrity. Similarly, the method can include the step of receiving input from the user device selecting a particular celebrity line from a plurality of available celebrity lines.

According to yet a further embodiment of the invention, an interactive system for providing video simulating a user's participation at an event (such as—for example—movement in a queue to obtain an autograph of a celebrity) is disclosed. The system comprises a plurality of discrete video channels, each channel corresponding to a signal from a respective video camera; and an interface system configured to receive the plurality of video channels and broadcast the plurality of video channels to a remote user device. The interface is further configured to selectively enable the display of the video channels (e.g., one at a time) on the remote user device to simulate a user's participation at an event. The user can actively participate in the event, for example, by providing an input signal from the user's device selecting merchandise to purchase, or identifying a specific location or a particular manner in which to view the event.

The systems and methods described can further include providing a certificate with the autographed item attesting to its authenticity. A picture or video (on a DVD, CD or VHS tape, or any other recordable or downloadable media) of the celebrity signing the item can be included with the certificate.

According to yet another embodiment, the present invention is broadly directed toward a system and method for providing an interactive experience wherein a remote user interacts or participates in a live event through a television and/or other communication device(s). The system can be used, for example, for an interactive experience wherein a user purchases an item.

Using a set top interface, the user can receive one or more live feeds from an event and can actively provide input to the live event to alter or manage the viewing experience, such as selecting a celebrity queue and obtaining an autograph as described above. Other examples include (but are not limited to) user interaction with a live salesperson or creator of a product to customize, produce and/or acquire a personalized product such as a painting or carving; or participation in or purchase of a live entertainment event, such as a musical, concert, or play.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 2 is a graphical representation of a virtual queue bandwidth structure;

FIG. 3 is a graphical representation illustrating information flows between the system of the present invention and a plurality of remote user devices;

DETAILED DESCRIPTION

Figure 1:
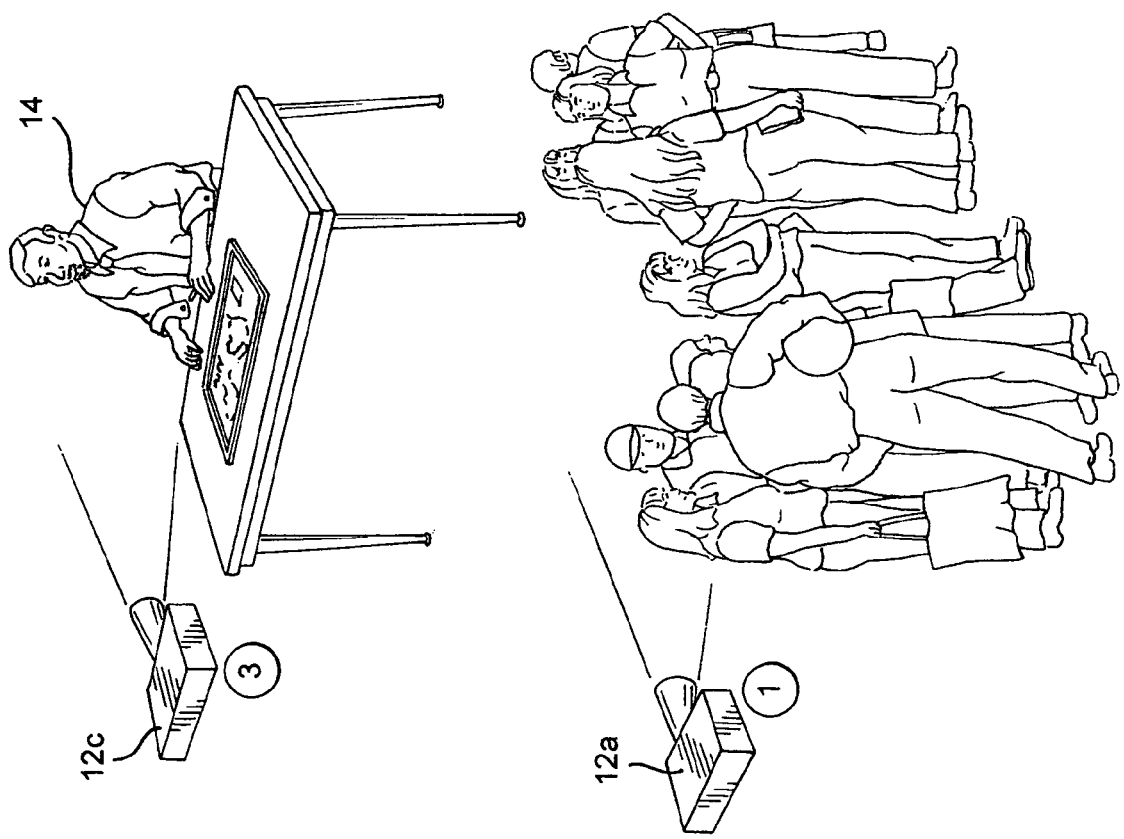
FIG. 1 is a graphical representation of a plurality of cameras positioned about a queue or line for meeting and obtaining an autograph from a celebrity in accordance with an embodiment of the present invention.

While this invention is susceptible of embodiments in many different forms, there is shown in the drawings and will herein be described in detail preferred embodiments of the invention with the understanding the present disclosure is to be considered as an exemplification of the principles of the invention and is not intended to limit the broad aspect of the invention to the embodiments illustrated.

The present system is designed to allow a user to participate in some form in a live event via the user's television or other remote communication device. An example that illustrates the interactive nature of the invention—between the remote user and the live event—involves the user's remote participation and viewing of an autograph session with a celebrity (in this example, the user interacts with the event by providing input selecting a celebrity queue and an item to be autographed). However, the system has broader applications wherein a user remotely interacts (at least to some extent) in a live event. This can range from selecting an item for purchase in a live selling format televised to the user, to input into unique product creation, to selecting a manner of watching a live event (e.g., the user may interactively choose the perspective to view the event from), to having more control over the direction of the event by providing input to interface of the system. The system includes a broadcast system for providing a video and/or audio feed of the live event, and a user device that receives the broadcast video/audio feed and provides an interactive signal from the user to the broadcast system.

As discussed above, in one preferred embodiment the system is utilized to simulate a line to a remote user for obtaining a unique item, such as an autograph from a celebrity (e.g., an actor, sports figure, author, etc.). Aspects of the system will be described with respect to this embodiment. However, such aspects can be utilized with a large variety of other formats.

The user accesses the system utilizing the user's television or computer (other components such as the user's phone, PDA, etc. can also be involved in the process). The system utilizes several cameras positioned to create a virtual queue, or line, to the celebrity. Signals from the cameras are switched to simulate the movement of the user through the line. The user progresses until just before the celebrity where the user can view the celebrity signing the user's purchased merchandise. At this point the user can optionally interact with the celebrity (e.g., through a typed question e-mailed to the system). The system can include more than one celebrity queue broadcast on different stations.

Referring to FIG. 1, three cameras 12a, 12b, 12c are positioned in a standard celebrity queue or line. The first camera 12a views the main line and provides an entertaining area for the user to wait. The second camera 12b is positioned closer to the celebrity 14. The second camera 12b can be a preparation area where instructions and/or other information can be conveyed to the user of the system regarding meeting the celebrity 14. The third camera 12c is positioned closest to and focuses on the celebrity 14 to provide a direct frontal view of the celebrity 14. This third camera 12c shows the celebrity 14 autographing the user's selected merchandise. One or more green screens 15 can be provided as described in detail below.

The system progressively switches the camera signal presented to the user's television or computer to create the effect of moving down the line toward the celebrity. Although only three cameras 12a-12c are shown in FIG. 1, additional cameras at different positions in line or at different angles can be added to further create or enhance the feel of moving in a line closer to the celebrity. Additionally, the cameras do not have to be stationary. That is, one or more of the cameras can provide a moving image.

Moreover, each step or camera signal can be used for additional purposes while the user is waiting, such as choosing an item for signature, providing information about the celebrity, showing film clips of the celebrity, promoting the celebrity's new movie, book or CD, other advertising or promotion, etc. Preferably, the video signals provided by the cameras 12a-12c are viewed live by the user.

The system can use well established broadcast technology in the unique manner described herein to implement the virtual line. Specifically, the system can use pre-existing data networks for signaling. The primary signaling path is a MPEG-2 data stream sent with the video. The signaling path can also include other interactive paths, such as a phone modem, DSL, cable modem or a cable out-of-band (OOB) signal.

The virtual queue provided by the system 2 is a collection of related data streamed from various content creation centers. From a technical standpoint, the queue is a collection of network bandwidth, divided into timeslots and set up to carry the video and data necessary to create the simulated experience. FIG. 2 illustrates a number of timeslots 16 utilized for various virtual queues 18. The celebrities are booked for particular slots 16. The queues 18 can have particular themes (e.g., pairs—two celebrities having a particular relation to each other, sports figures, etc.).

FIG. 3 illustrates the various content or information flows from the system 2 to the user's television 20 or computer 22 or phone 24, etc. The home channel 26 to a user's television set 20, is a data only MPEG-2 program, carried in an MPEG-2-MPTS (Multi-Program Transport Stream). The home channel 26 is a one-way broadcast channel carrying basic information for the system 2, including welcome messages and other fundamental data. The primary piece of information provided by the home channel 26 is the overall queue directory for the system 2. The queue directory contains a listing of all available queues 18 along with information relating to each queue 18. Such information can include: a unique ID for each queue; a source ID (i.e., a unique ID for the "channel" carrying the queue); a description of the queue; the name of the queue celebrity(ies); start and end times; number of cameras/stages; etc. The home channel 26 carries the data as MPEG-2 private data sections in a carousel format. The system 2 assigns the home channel a fixed and permanent source ID, so that the television (i.e., through a cable or satellite set top) knows where to tune in order to receive the home channel data.

The system can be configured so that only an authorized television can tune to the home channel 26. Technology utilized for authorizing premium cable stations (e.g., HBO, Cinemax) can be utilized in this regard. The system 2 prevents unauthorized users from viewing the content because all content is encrypted with the operator's conditional access (CA) system.

The queue content and data flow 28 is also a full MPEG-2 program carried in an MPEG-2 MPTS. This data flow 28 can be part of the home channel flow 26, or it can be a separate flow. The queue content and data flow 28 can contain multiple video, audio and data components for which the MPEG-2 program provides a "wrapper." The video and audio components carry the various camera feeds or signals for the queue 18, while the data component carries the switching and queue management messages to instruct the television 20 or computer 22 when to switch video components to a different camera feed. Wrapping all the queue 18 information into a single package ensures all the related information arrives together and in synchrony. The MPEG-2 program wrapper also provides a universal delivery package understood by both satellite and cable television systems.

The system 2 also includes an interactive link 30. The interactive link 30 is a TCP/IP link designed to carry interactive data to and from the user. The physical connection for the link 30 can take a variety of forms, depending on the capabilities of the user's home. The primary examples are: telephone modem, DSL (Digital Subscriber Line), and DOCSIS cable modem. These may connect directly to the computer 22 or television 20. Alternatively, the physical connection for the link 30 can feed into a user's home network, if available. In this instance, the user's computer 22 or television 20 would connect to the home network via home networking technology such as HPNA (Home Phoneline Networking Alliance), WiFi or standard Ethernet.

The system 2 can further include a basic interactive voice link 32 that provides a limited level of interactivity for the user. This voice link 32 communicates via dual tone multfrequency (DTMF—i.e., the tones heard when dialing on a phone) or straight voice. The link 32 connects the user to the system's call center 34, where an interactive voice response (IVR) system responds to the DTMF tones or a real-live person (RLP) speaks with the user. The IVR or RLP interfaces the user to the control system.

The system 2 can also include a basic interactive data link 36 that provides a limited level of interactivity through an out-of-band (OOB) data channel found on the cable networks. The link 36 is a medium speed link designed for low rate interactivity with a headend-based server. Currently, VOD (video on demand) systems are the primary users of the OOB channel to communicate "trick-play" commands, like "play," "pause" and "rewind." This channel also carries all the cable system's operational information.

In operation, the user of the system begins by accessing the system's home channel (e.g., tuning the user's television 20 to the appropriate channel) (see flow "A," i.e., reference no. 26 in FIG. 3). The system 2 gathers basic initialization data and the queue 18 directory from this MPEG-2 data program channel 26. Initialization data can include (for example): a welcome message; a user interface look and feel information/ template; and advertisements etc. After the user views a welcome message and any advertisements, the user moves to investigate the available queues 18. The system application displays the current queues and their associated information based on the information received from the queue directory. The user then selects the queue 18 the user would like to enter by use of the set-top box or television set's remote control, or by use of the Internet or any other remote or wired device, using a drop-down menu box on the display or other known guide technologies.

Based on the user's queue 18 selection, the system application tunes to the main video component of the selected queue 18 (see flow "B," i.e., 28 in FIG. 3). The system application uses the source ID associated with the desired queue 18 in the queue directory to make this channel change. Once the user enters the queue 18, the system application also tunes and monitors the queue's data link for queue information. This information includes (for example): the celebrity(ies) name(s); a description of the queue; status information; schedule information, including scheduled time for the user to meet the celebrity, and advertisements. While viewing, the system application monitors the data channel for queue "movement" commands. These commands instruct the television to tune another video component (e.g., a feed from another camera in the system) to simulate moving in the queue 18.

The user can interact with the system, for example, to make a reservation for a queue 18. The user's interaction can take place via the television 20 (through flow "C," 30 or flow "E," 36), or the telephone (through flow "D," 32), or via the computer 22 (through flow "C," 30).

Figure 4:
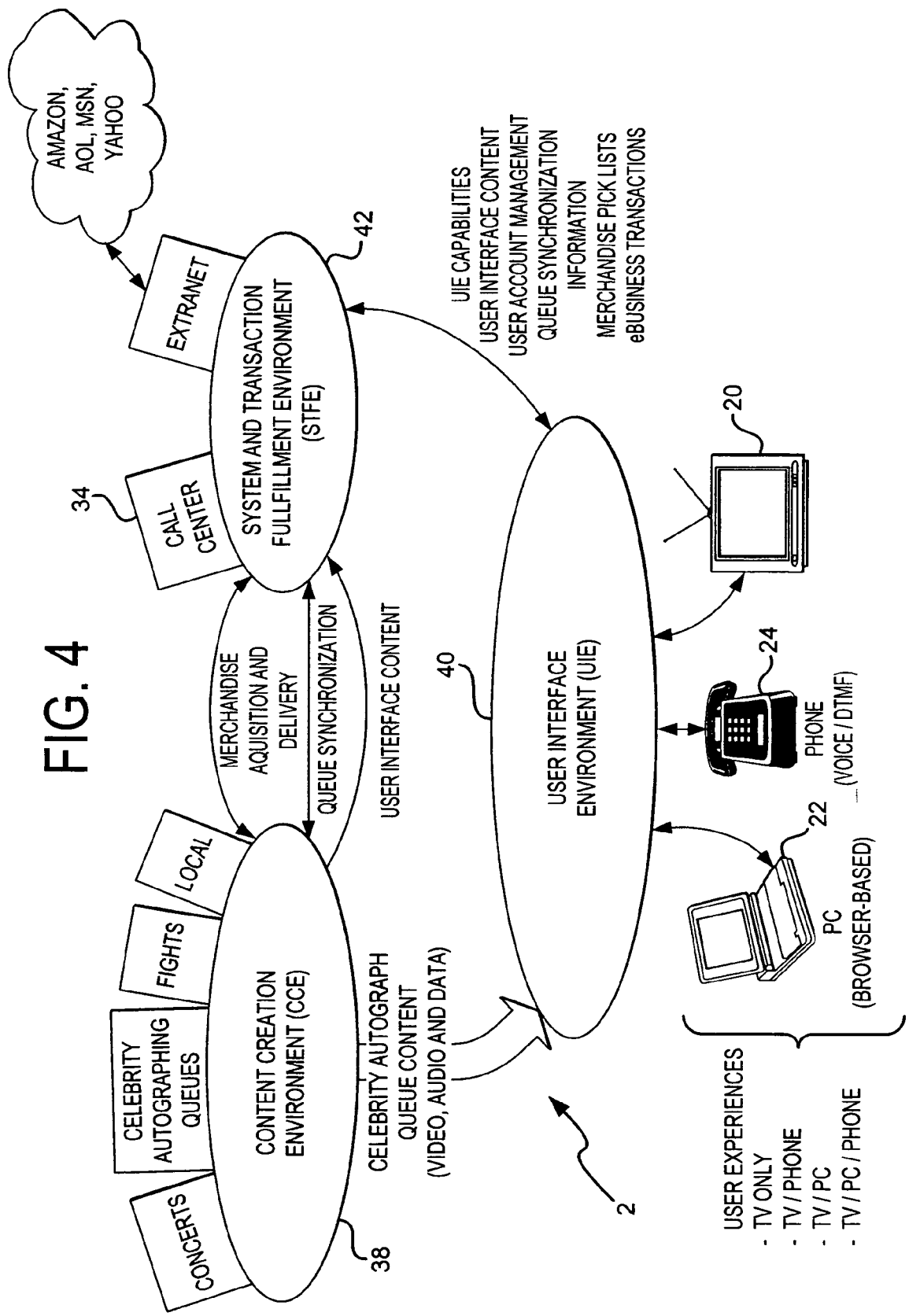
FIG. 4 is a graphical representation of a high level functional architecture of the present system.
Figure 5:
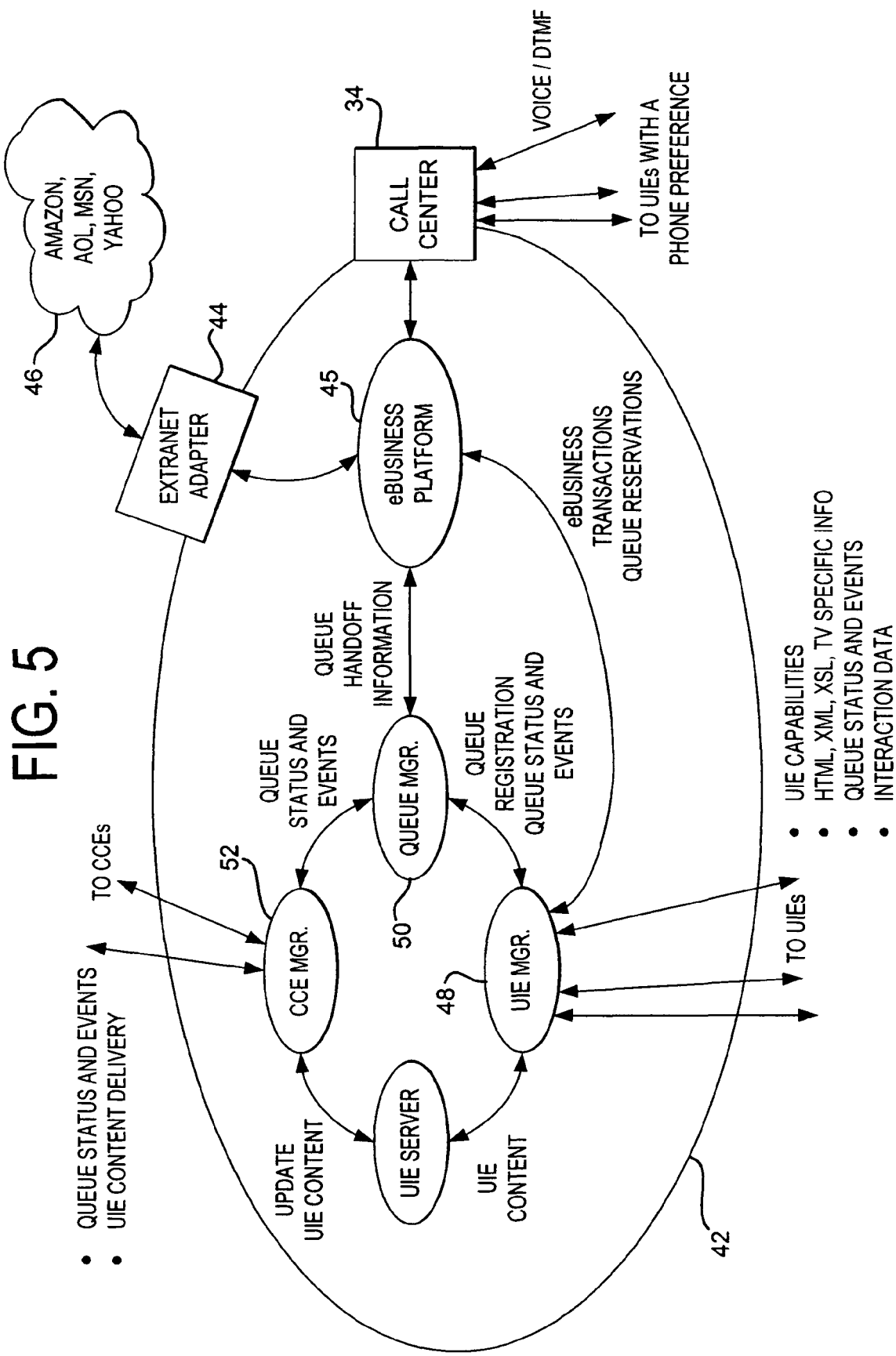
FIG. 5 is a graphical representation of a high level functional architecture of the system and transaction fulfillment environment (STFE) component of FIG. 4.
Figure 6:
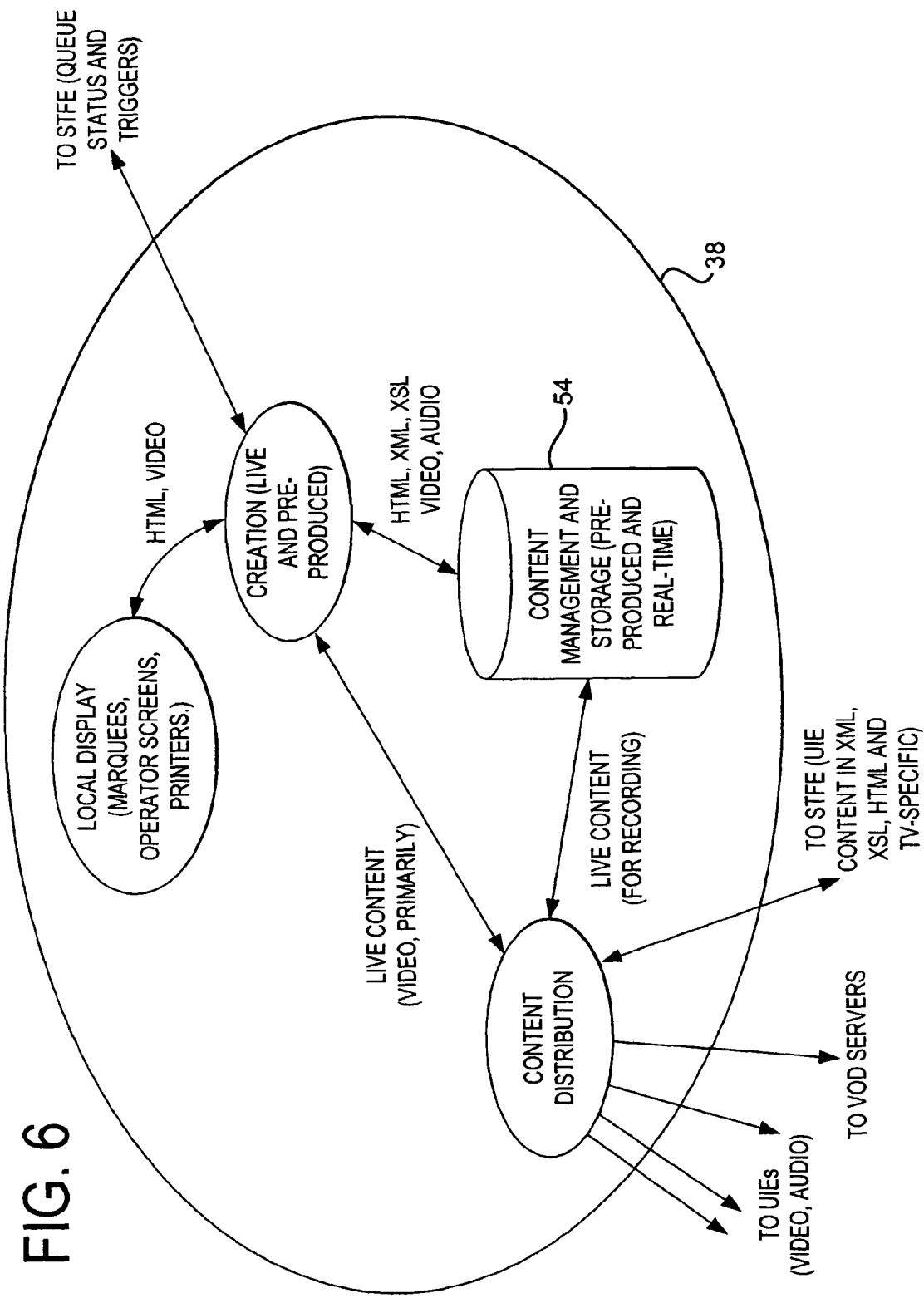
FIG. 6 is a graphical representation of a high level functional architecture of the content creation environment (CCE) component of FIG. 4.
Figure 7:
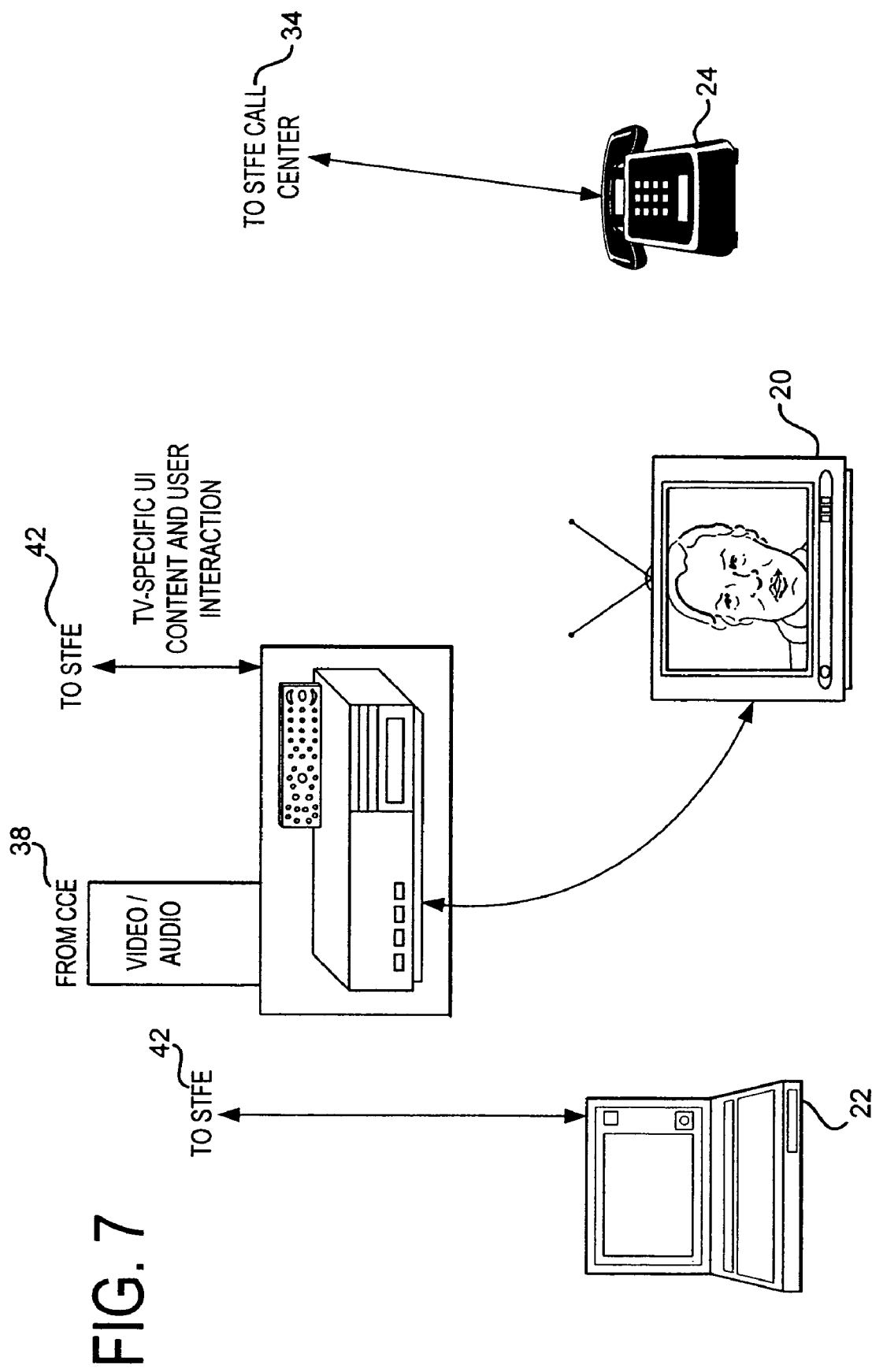
FIG. 7 is a graphical representation of a high level functional architecture of the user interface environment (UIE) of FIG. 4.

The generic functional architecture of the system 2 includes three basic components: a content creation environment (CCE) 38; a user interface environment (UIE) 40; and a system and transaction fulfillment environment (STFE) 42. These three components work closely together as illustrated in FIG. 4. Each of the environments 38, 40, 42 has its own internal states and state transitions. Additionally, each environment 38, 40, 42 interacts with the other environments to influence the state of the user's experience.

The CCE 38 handles the creation and integration of content. It is the source of all content presented to the user by the system 2.

The UIE 40 presents the user with a fully integrated and interactive experience. The UIE 40 may execute on single or multiple hardware platforms within the user's home. For example, the UIE 40 may execute only on the television 20, or it may execute on a combination of the television 20 and computer 22, and possibly other components such as a PDA or cell phone.

The STFE 42 interfaces to all the environments 38, 40 to ensure a close, cooperative collaboration. The STFE 42 manages the virtual queues 18 and synchronizes the UIE 40 to movement in those queues 18. The STFE 42 also provides any templates and/or MIME types to the CCE 38 for proper creation of content. Additionally, the STFE 42 also provides merchandize management and transaction fulfillment (e.g., shipping autograph merchandise to the user). It also processes all user requests to purchase merchandise and select celebrity queues 18.

The STFE 42 plays a central role in the functional architecture of the system 2. The STFE's 42 major functions are grouped into three main areas: user management; system operation and queue management; and transaction fulfillment.

User management functions include: Registering new users and administering their accounts; establishing, authenticating, and maintaining sessions with each user; maintaining capabilities of each user environment (i.e., television 20 v. computer 22 v. PDA v. cell phone etc.); and maintaining the interaction state of each user. The system operation and queue management functions include: determining and tracking virtual queue 18 characteristics (e.g., depth, scheduling, priorities) and managing queues; providing a database repository for user interface content; and recognizing event triggers and issuing commands to coordinate and synchronize activities within the CCE 38 and UIE 40 (including sourcing all camera switching commands). The transaction fulfillment functions include: taking customer (i.e., user) orders; booking queue 18 reservation for future and current autograph sessions; and fulfilling orders for standard merchandise as well as autographed merchandise.

Upon startup, the STFE 42 authenticates the user and provides subscriber specific data, style templates and MIME types. The STFE 42 also manages all interactive UIEs, tracking their capabilities (e.g., TV-only, TV with Computer, TV and PDA, etc.) and maintaining constant communication with them to synchronize status and other external events. The STFE 42 also provides redirection and/or a gateway to other content sources, as appropriate, for chat rooms, e-commerce, etc. The STFE 42 maintains user accounts and provides the interface to manage them including a call center 34.

The STFE 42 directs each state change for subscribers (i.e., users) in each queue 18. For example, when a user in a virtual queue 18 moves from the line to the preparation area (i.e., the final stage before meeting the celebrity), the STFE 42 signals the UIE 40 to change camera angles, i.e., from the first camera 12*a* to the second camera 12*b*. The STFE 42 also notifies a physical queue handler (i.e., a person at the CCE site) to move people and merchandise to the preparation area, and if necessary, address the user via video camera. The queue handler can also reconcile any scheduling conflicts for a user in multiple queues.

The STFE 42 is responsible for acquiring and shipping merchandise to users of the system 2. It also ensures the celebrity autograph events have the appropriate merchandise in the necessary quantities. After an event, the transaction fulfillment system of the STFE 42 handles delivery of merchandise as well as returning un-used merchandise to the warehouse. The STFE 42 also provides a gateway 44 (e.g., an Extranet adapter) to other business partners 46 (e.g., Amazon, Yahoo, MSN, AOL, etc.). The interface 45 for the gateway 44 could be in the form of a business-to-business (B2B) format or an electronic data interchange (EDI) format. The STFE 42 also handles merchandise return from a user and credit issues.

The STFE 42, through a UIE manager component 48, gathers capability information from each user interface. This includes video display capabilities, such as MPEG-2, web content handling capabilities (e.g., HTML, XML and XSL). The STFE uses this information to tailor the user interface content delivered to the UIE 40. The user interface content includes television specific data for use in a television 20 environment, and HTML (or XML or XSL) content for a browser based display environment (as well as content for other possible environments, e.g., cell phone, PDA, etc.).

The STFE 42, through a queue manager component 50 (with possibly assistance by the UIE manager component 48), controls all queues 18, and delivers the necessary queue events and the appropriate command to synchronize the user interface with the queue manager component 50. For example, when a user moves to the autograph station in the virtual queue 18, the STFE 42 signals the UIE 40 to change channel (i.e., from camera 12*b* to camera 12*c*) in order to see the celebrity signing the merchandise. The STFE 42 also periodically communicates queue status information to insure proper synchronization of the UIE 40 with the physical queue.

The STFE 42 and the UIE 40 communicate any interaction the user has with the system 2. This includes queue 18 selection, commerce, reservations, etc. The interaction data could arrive via an IP connection or via the call center.

The STFE 42, through a CCE manager component 52, controls all queues 18 and delivers the necessary queue events to the CCE 38 to synchronize the CCE 38 with the queue manager 50 status. For example, when a user moves to the autograph station of a virtual queue 18, the CCE manager component 52 signals the CCE 38 to notify the physical queue handler to advance in the queue 18 and perhaps address the user via the camera and instruct them how the autograph session will work. The CCE manager component 50 also periodically communicates queue status information to insure proper synchronization of the CCE 38 with the queue manager component 50.

The STFE 42 accepts and manages all the user interface content created and delivered by the CCE 38. The STFE 42 stores the content and serves it to the user (through the UIE 40) as they log on and interact with the system 2.

The CCE 38 creates, manages and manipulates the video, audio, and data content delivered to the UIE 40 for presentation to the user. In this regard, the CCE 38 provides content creation, including video pre-production, live video production, Internet MIME type authoring and DVD production. To accomplish such creation, the CCE 38 includes television production facilities, web content creation platforms, asset management tools, audio and video transmission facilities, and Internet connectivity. The CCE 38 is a geographically distributed platform, where video and audio content from various locations converge to create bundled streams (multiplexes) for distribution through an operator's network to users. The content can include dynamically produced real time video and audio components (e.g., the signing by the celebrity) and pre-produced static content (e.g., advertising). The CCE 38 also uses data for controlling the presentation of a basic graphical user interface (GUI).

Video pre-production, as mentioned above, includes all of the non-live video and audio assets needed to support the UIE 40. This can include backgrounds, advertisements, etc. Any necessary overlay areas (such as chroma keyed video overlay) are inserted during pre-production. Live video production includes capturing of live video from the celebrity autograph queue(s) 18, the insertion of any pre-produced content and the insertion of real-time data (received from the STFE 42) into marquees and overlays.

Internet MIME type authoring involves the following Internet MIME types, authored both statically and dynamically: HTML, XML; XSL; Rich Media and Java Applets. The system 2 uses some HTML for delivering and presenting information to the user. The CCE 38 utilizes XML for delivering certain information, such as merchandise Pick-lists, Scripts for celebrity queue hosts and queue status marquee displays. XSL provides templated for device specific presentations including Browser, Phone, PDA, advanced televisions 20. Rich media types for inclusion in the user presentation include Micromedia Flash, MPEG video and MP3 audio.

The final stage of content creation is delivering it to the users of the system 2. This requires video uplinks to allow the CCE 38 to uplink live video feeds or signals to DBS/Cable satellites for broadcast to user homes. Additionally, real-time video recording is provided to the content storage system 54 (the system can burn DVDs or tapes from this system 54 for delivery to customers). File servers that interface with the content storage system 54, are provided for storing and sharing content. Virtual Private Network (VPN) gateways allow the use of the standard file server network for access to content from geographically disparate locations (these are unnecessary if a single location houses the system 2). Internet servers (e.g., HTTP and FTP servers) provide the primary mechanism for distribution of content. VOD pitchers provide video content to local VOD systems. A "pitcher" typically uplinks the content to a satellite for broadcast to a wide area. Additionally, the CCE 38 can utilize a variety of digital transport system to interconnect with both internal and external systems.

The CCE 38 and the STFE 42 interact on several aspects of the system 2. The STFE controls synchronization of content "events" between the UIE 40 and the CCE 38. The STFE 42 uses actions and trigger events to achieve such synchronization. For example, when the STFE 42 determines it is time for a user to enter the celebrity autograph area, it notifies the CCE queue manager via a message on the user's computer, and also notifies the user's television 20 to switch channels to the broadcast component carrying that celebrity's live video feed (i.e., from the camera 12*c*). The STFE 42 can request XSL style templates and MIME types for distribution to the UIE 40. This is often done to support UIE 40 initialization when a user first logs onto the system. Afterwards, the UIE may access the CCE 38 directly for content. The STFE 42 delivers queue 18 status information (e.g., time remaining, number of people in queue, names of queue members, queue statistics, etc.) to the CCE 38 for insertion into the broadcast video content. The CCE 38 can insert this data in a variety of ways, such as a marquee or overlay screen 15.

The CCE 38 requires the necessary merchandise to support the virtual queue environment. Merchandise must be on hand at the time of celebrity signing in order to film the signing of the object. This requires communication of acquisition and delivery information with the STFE 42.

The STFE 42 maintains the user database. The CCE 38 may request user information as it develops content for a virtual queue 18. Such information may include: name, preferences, merchandise selections and past purchase information. The CCE 38 and the UIE 40 trade any user specific data required for the service. This may include: celebrity questions and queue preparation advisories.

The UIE 40 is responsible for integrating the content assets made available to the user's receiver (typically a cable or DBS digital television 20). The UIE 40 also provides for the possibility that multiple devices may be employed to provide the user experience. A goal of the UIE is to minimize the software requirements on the user's devices, and to target as wide a population of existing and emerging user devices as possible.

The UIE 40 is the system's "store front" to the user. It gathers all the data from the STFE 42 and the CCE 38 and displays it for the user. Display can be one or more screens 15, depending on the user's home configuration (e.g., both the television 20 and the computer 22). The UIE 40 processes and relays, when appropriate, user interaction data to the proper system components.

Figure 8:
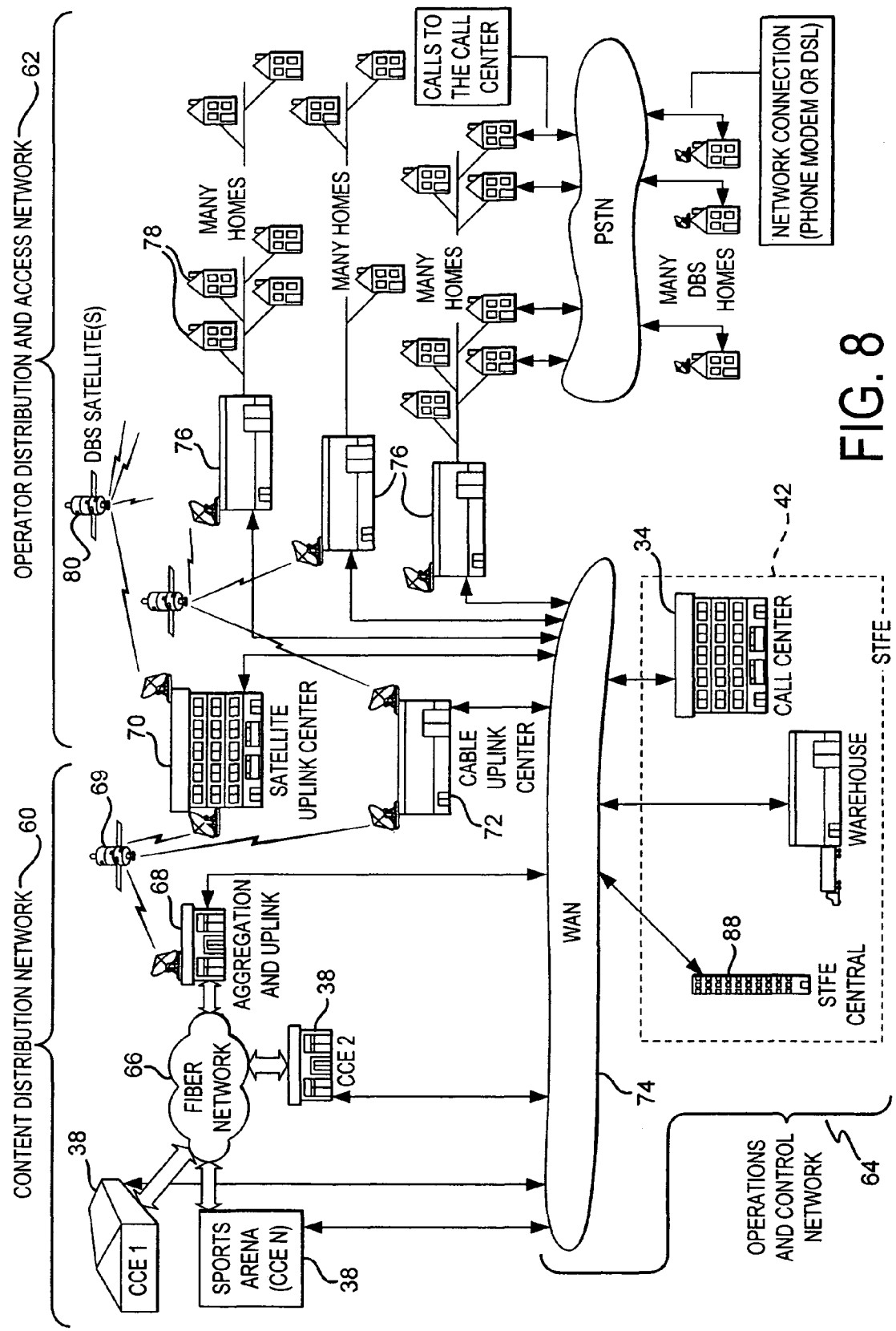
FIG. 8 is a graphical representation of a high level network architecture for the present system; and, FIG. 9 is a graphical representation of a generic cable headend for use with the present system.

FIG. 8 illustrates the network architecture for the system 2. The architecture includes a content distribution network 60, an operator distribution and access network 62 and an operations and control network 64.

The content distribution network 60 sources and distributes the system's content to access network operators, such as DBS or cable. Content from one or more content creation environments (CCE) 38 are shown connected by a fiber network 66 to an aggregation and uplink center 68. The content sources are multiplexed and uplinked via a satellite 69 (or transmitted via a cable network) for distribution to the cable and satellite operators from the center 68. That is, the center 68 transmits the content from each CCE 38 to a satellite uplink center 70 and a cable uplink center 72. Since all content flows into the aggregation and uplink center 68, it can discard undesired video components of the content. Additionally, the aggregation and uplink center 68 can interact with the STFE over a wide area network (WAN) 74.

The cable uplink center 72 transmits the content to one or more cable headends 76 for transmission to user devices located in the user's homes 78. The satellite uplink center 70 transmits the content to a satellite 80, which in turn, transmits the content straight to the user's homes 78.

In addition to the video content, the satellite uplink center 70 also inserts all necessary data, such as operational data, electronic program guide (EPG) listings information and any other data associated with interactive television applications. The operational data can include, for example, software downloads, television authorization messages and channel maps.

The cable uplink center 72 inserts content or data at the center 72 or at a cable headend 76. Content provided at the headend 76 includes data relating to local channels, local advertising and VOD (video on demand) content. The cable headend 76 also provides an insertion point for other services, such as high speed data and telephony. Each cable headend 76 houses the master controller for all television set tops 20 hosted by the headend 76.

The operations and control network 64 provides the connectivity for control and operation of the overall system 2. The heart of this network 64 is the IP-based WAN 74 to which all major components connect.

There is a variety of data connections to and from the home 78. One connection, common to both satellite and cable systems, is a MPEG-2 data component riding with the video streams. The CCE 38 inserts this data stream (received from the STFE 42) directly into the MPEG-2 stream creation device (e.g., an encoder) to produce a multi-program transport stream containing all the video, audio and data components combined into a single digital multiplex. The television 20 ultimately receives and de-multiplexes this "package," interprets the components and takes appropriate action. This data channel is the best choice for communicating queue specific information, such as queue directory and queue position switching commands (as user's "move" in the virtual queue 18) to the user's television 20.

Figure 9:
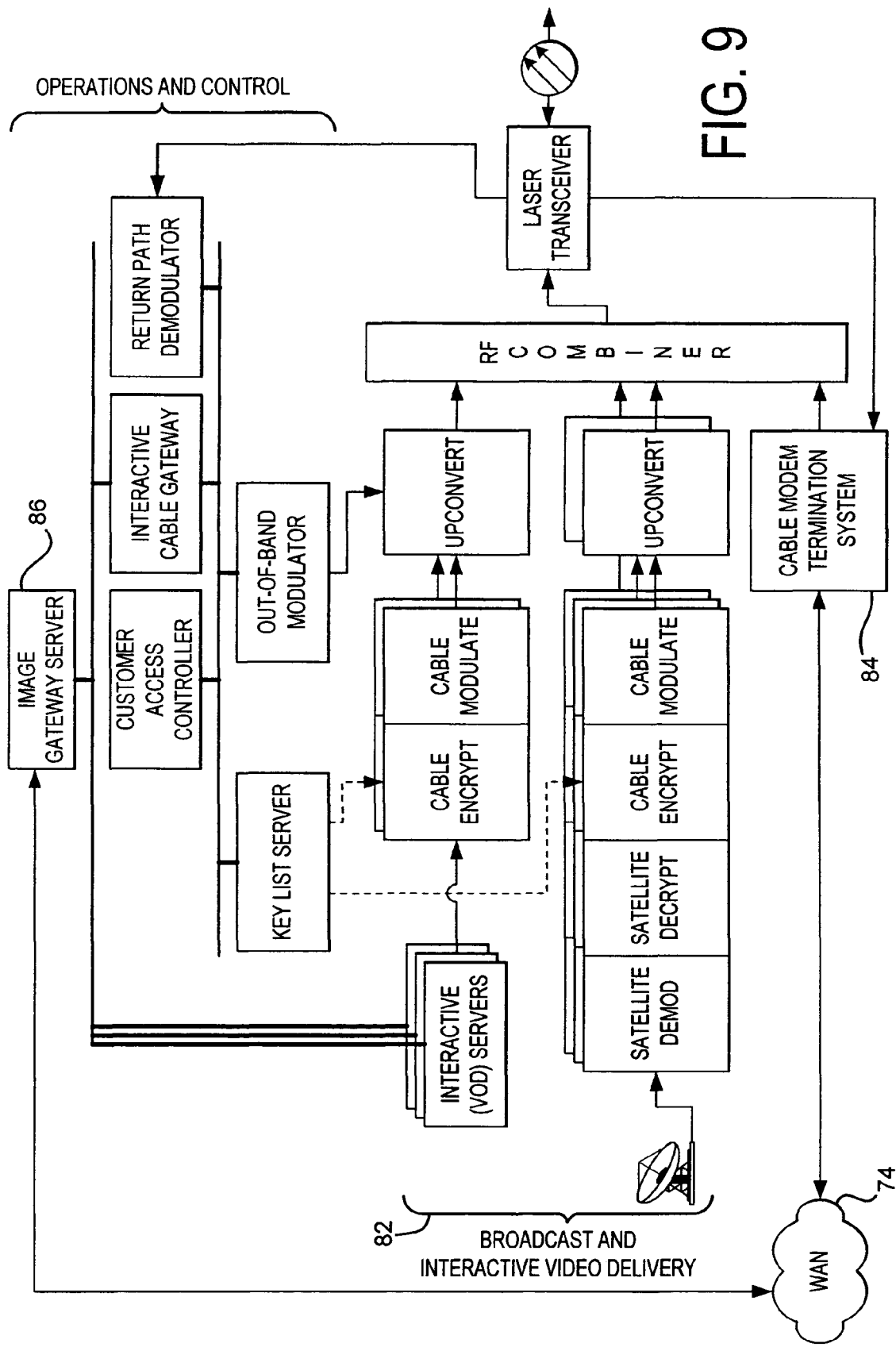

FIG. 9 illustrates a typical cable headend 76 that can be utilized in conjunction with the present invention. The center of FIG. 9 includes primary components for delivering both broadcast and interactive video 82. FIG. 9 also discloses a cable modem termination system (CMTS) 84 and a gateway server 86 to provide access to the WAN 74. The gateway server 86 acts as a translator between the central STFE controller 88 (see FIG. 8) and each of the user devices managed by the headend 76. Its primary translation function is addressing/routing of packets from the STFE 42 to each user device (e.g., 20 or 22). The gateway server 86 provides an IP address for each user device (however, this address is only unique within the domain of the headend). When a packet arrives at the gateway server 86, it routes the packet to the local IP address for the specific user device.

Walking through the following example of the system will illustrate the various televised environments a user navigates through in participating in an interactive event. The example is provided with respect to selecting an autograph queue and obtaining an autograph; however the system can be utilized for a large variety of live events wherein input from the user effects the user's viewing of the event in some manner.

In a first or initial environment (upon tuning onto a log-in channel broadcast by the system), a greeter welcoming the user or a welcome message is broadcast or transmitted to the user's television (this can be a recorded segment). The greeter invites the user to log-in if already registered with the system (e.g., a subscriber), or to register. Icons can be provided for the user to log-in or register. The user can utilize a remote for the set top to navigate to and click on the appropriate icon.

If the user clicks on the "register" icon, the user is directed to a screen 15 for gathering relevant data (e.g., address, credit card number, etc.) and for selecting or customizing on-screen 15 characteristics of the greeting environment (e.g., select the greeter from a list of greeters or greeter types such as a young man or woman, older man or woman, business type person, hippie, game show host, etc.).

Once registered, the user can log-in. This screen 15 prompts the user to enter an ID and password. Once entered, the selected greeter type welcomes the user to the system. The greeter can explain the various interactive viewing options available to the user, and assist the user in navigating through the system. These options include: the schedule and identity of autograph signing guests, listening to music or watching videos of the celebrities appearing in the autograph lines, chatting with other users in an autograph queue, shopping, bidding at an auction, playing games, and entering contests to win prizes. The greeter may prompt the user to quickly select a queue if nearing the end of an autograph session or upon sensing the wait in line becoming large.

The user can click on an icon that provides a schedule of autograph signing quests. A drop down menu can be used to provide the list of and the times appearing. When the user clicks on a celebrity's name the environment changes.

The next environment can be a live feed of a large room (i.e., a studio set) with the hustle and bustle, ambient nose and fluidity of an office or warehouse operation with lots of action. The user is provided with a live camera view of the actual signing location from a distance at the back of the line. The user will be able to see, for example, people sitting at tables looking into cameras, people moving merchandise around, people standing in lines at tables—just like being in person at a real autograph signing session.

The back walls of the studio set will feature a plurality of green screens 15 15 that will function as a menu board with drop down boxes, and as full motion and still advertising with commercials digitally displayed on the screens 15 15. The greeter can appear on one of the screen 15s and prompt the user to place an order for merchandise by clicking on an autograph merchandise icon and to get in a queue for an autograph via an autograph icon.

Clicking on the autograph merchandise icon causes a menu box showing a selection of items that are in stock that can be autographed to appear on one of the green screens 15 15. These items are guaranteed to be signed right in front of the user on his screen 15, which can be recorded. If the user doesn't want to wait to view the signing, the box provides a buy it now option. The cost of the item and autograph fee are posted on the screen 15 as the items are being chosen. When the user is finished placing an order for signed items, the user's credit card is charged and the user is given a position in the queue for the in-person autograph experience. A countdown clock can be provided giving the user an approximate waiting time.

The countdown clock lets the user know the approximate time of the encounter (whether getting an autograph, or creating a unique item for purchase). The clock would appear on-screen at key times in the process, alerting the user to time remaining until the event. At a predetermined time prior to the event, e.g., five minutes, the clock can appear and remain on-screen in a countdown mode. The system will automatically coordinate the clock with the event—such as placement in a queue—hesitating or pausing as needed to make sure the event and the clock coincide in real time. The clock is aligned with all systems necessary to know when the purchased merchandise is in queue for signing, and any delays that occur due to human error or out-of-system issues. When the user signs up for an event, the clock keeps track of their time on the system.

Depending on the waiting time, the greeter will again appear on one of the green screens 15 to provide the user with available options that can be utilized while the user waits. Again, the greeter segments can be pre-recorded segments or messages.

A menu box giving options to get in queue for other autograph signing quests without losing the user's place in the current line can appear on one of the green screens 15 15. The user can then order merchandise to be signed. The system can compare the waiting times and determine whether the second or subsequent lines will conflict with the user's approximate signing time in the current line.

A menu box giving options to buy merchandise related to the celebrity can also appear in one of the screens 15 15. These items may be available for shipping only and may not be able to be signed.

A green screen 15 can also include a menu box providing the user access to an interactive auction. The user can bid using the remote control to the interface.

A green screen 15 can also include a menu box providing the user access to a chat room. A standard chat room box will allow the users in a queue to talk to each other.

A menu box providing the user videos or audio selections of music or spoken word readings of the celebrity in queue (or others) can also appear on a green screen 15. This can be used to promote products available for sale (e.g., music CDs, etc.).

A menu box providing the user access to games that can played alone or with other people in the queue can also be provided. Prizes could be awarded in the form of celebrity merchandise or advertiser's products to players that win or achieve certain scores. Similarly, a menu box can be provided giving the user access to a selection of contests can be provided (for similar prizes).

The user can also click on advertisements appearing in the green screens 15 15 to receive more information on a product, coupons, gifts, promotions, or prompting from a digital interactive advertising applications. The advertisements can be full motion video or still images. The ads can be targeted to specific users based on the data provided in the user's registration or by style or type of the celebrity in the queue.

At a predetermined time before the approximate signing time, the greeter can return to the screen 15 and indicate it is time to move forward. This changes the camera feed to the user to a relatively close angle real time shot of the celebrity (e.g., about 10-15 feet away). The user will be able to see the celebrity taking to people. The option icons or buttons are still visible on one of the green screens 15 15.

At this point, the greeter can appear on a green screen 15 and ask the user if they would like to submit a question to the celebrity. The user is then prompted to type in a question.

Countdown warnings can be provided, for example at 10 minutes, 5 minutes, 2 minutes before the signing time. When the countdown clock reaches zero, the environment changes to a camera that is dead-on the celebrity with the celebrity looking directly into the camera. The celebrity can then greet the user (using the user's name), answer any pending question, and sign the selected merchandise.

Following the signing, the camera feed is changed back to the initial view from the back of the queue, or is changed to a new queue the user signed up for. If the user has completed the autograph session, the user can change the channel or turn the set off. There is no need to log-out.

While the specific embodiments have been illustrated and described, numerous modifications come to mind without significantly departing from the spirit of the invention, and the scope of protection is only limited by the scope of the accompanying Claims.

What is claimed is:

1. An interactive system for simulating a queue for obtaining an item, an autograph from a celebrity viewable from a remote user device comprising:

a first camera positioned at a first point of a line in a celebrity queue providing a first video signal of the line from the first point;

a second camera positioned at a second point of the line and providing a second video signal of the line from the second point;

a third camera positioned at a third point of the line and providing a third video signal of the line from the third point; and, an interface configured to interactively communicate with a remote user device to create a timed interactive event including broadcasting the signals to simulate movement in a queue for obtaining an autograph in real time, and to provide the remote user device with a display of a list of a plurality of available celebrity queues and a list of available items to be autographed and to receive an input signal from the remote user device identifying a celebrity queue from the plurality of available celebrity queues and an item to be autographed by the celebrity and to place the remote user device in position in the identified queue, the interface further configured to selectively broadcast the first, second and third signals of the identified celebrity queue to the remote user device in real time and switch between the first, second and third signals to simulate movement in the queue on the remote user device, the interface including a countdown clock that provides a signal to the remote user device to display a time remaining until the timed interactive event after receipt of the input signal from the remote user device identify celebrity queue.

2. The system of claim 1 wherein the interface receives queue status information to control the countdown clock displayed to the user.

3. The system of claim 1 wherein the queue interface information includes one of time remaining in the queue and number of people in the queue.

4. The system of claim 1 wherein the interface automatically coordinates the countdown clock with placement in the queue to ensure the signing of the autograph and countdown clock coincide in real time.

5. The system of claim 1 wherein the first, second and third video signals are broadcast in a format receivable by a television set.

6. The system of claim 1 wherein the first, second and third video signals are broadcast in a format receivable by a computer.

7. The system of claim 1 wherein the user interface provides data relating to the line for receipt on a personal digital assistant (PDA).

8. The system of claim 1 wherein the interface further broadcasts additional information to the remote user device.

9. The system of claim 8 wherein the additional information is advertisement.

10. The system of claim 1 wherein the first camera further providing an audio signal of the line.

11. The system of claim 1 further comprising the interface system being configured to broadcast the video streams via a cable system.

12. The system of claim 1 further comprising the interface system being configured to broadcast the video streams via a satellite system.

13. A system for simulating participation in a line for obtaining an item, an autograph of a celebrity comprising:

a plurality of cameras, each camera providing a video stream of a celebrity queue line; and, an interface system configured to interactively communicate with a remote user device to broadcast the video streams to simulate movement in a queue for obtaining an autograph in real time, and for providing a list of a plurality of available celebrity queues for display on the remote user device and items to be autographed and for receiving an input signal from the remote user device identifying a celebrity queue from the plurality of available celebrity queues and an item to be autographed by the celebrity and broadcasting each video stream to the remote user device in real time and switching among each video stream to simulate movement in the line of the identified celebrity queue on the remote user device, the interface including a countdown clock that provides a signal to the remote user device to display time remaining until signing of the autograph after receipt of the input signal from the remote user device identifying a celebrity queue.

14. The system of claim 13 wherein the interface delivers status information regarding the identified celebrity queue to the user device.

15. The system of claim 13 wherein the video streams are broadcast in real time by the interface system.

16. The system of claim 13 further comprising the interface system being configured to broadcast the video streams via a cable system.

17. The system of claim 13 further comprising the interface system being configured to broadcast the video streams via a satellite system.

18. The system of claim 13 further comprising the interface system broadcasting a data stream with the video streams to the remote user device.

19. The system of claim 13 wherein each video stream includes an audio stream component.

20. An interactive system for allowing a user to remotely participate in a live event comprising:

a broadcast system configured to generate a plurality of discrete video channels, each channel corresponding to a signal from a respective video camera viewing a live event;

an interface system configured to interactively communicate with a remote user device in real time to create a timed interactive event including receiving the plurality of video channels from the broadcast system and transmitting the plurality of video channels to the remote user device in real time, the interface system further configured to provide the remote user device with a list of events for user participation and to receive a signal from the user device identifying an event for user participation and to switch the video channels to simulate the user's participation at the identified event, the interface including a countdown clock that provides a signal to the remote user device to display time remaining until the identified event.

21. The interactive system of claim 20 wherein the user signal selects an item to be purchased by the user.

22. The system of claim 20 wherein the user signals identifies a queue for obtaining an autograph of a celebrity from a plurality of queues.

23. The system of claim 20 wherein the video channels include an audio component.

24. The system of claim 20 wherein the system includes an interactive link to allow the user to interact with the system.

25. An interactive system for providing video content simulating a user's participation at an event comprising:

a plurality of discrete video channels, each channel corresponding to a signal from a respective video camera;

an interactive system configured to interactively communicate with a remote user device in real time including receiving the plurality of video channels and broadcasting the plurality of video channels only to the remote user device, the interface further configured to provide the remote user device with a list of available events for display on the remote user device and selectively enable the display of the video channels on the remote user device to simulate the user's participation at an event in response to receiving a signal identifying the event from a plurality of available events from the remote user device, the interface including a countdown clock that provides a signal to the remote user device to display time remaining until the identified event.

26. The system of claim 25 wherein the event is an autograph session with a celebrity and the interface selectively enables and controls the plurality of video channels on the remote user device to simulate movement in a queue toward the celebrity.

27. The system of claim 25 wherein each video channel provides a different perspective of the queue.

28. The system of claim 25 wherein the event is a live purchasing event.

29. The system of claim 28 wherein the signal from the remote use device identifies an item for purchase.

30. The system of claim 1 wherein the interface is further configured to receive an input signal from the remote user device containing a message for a celebrity in the identified celebrity queue.

31. The system of claim 1 wherein each celebrity queue includes a data link containing queue status information and wherein the interface is further configured to monitor the data link.

32. The system of claim 31 wherein the queue status information includes: time remaining until signature and number of users in the queue.

33. The system of claim 1 wherein the interface is further configured to register new users to the system and to establish and maintain sessions with each user.

34. The system of claim 1 wherein the interface provides a signal to a queue handler to move an identified item to be autographed to the celebrity.

35. The system of claim 1 wherein the interface is further configured to allow a user of the remote user device to chat with other users in the identified celebrity queue.

36. The system of claim 1 wherein the interface is further configured to allow a user of the remote user device to switch from a first delivery device to a second delivery device different from the first delivery device.

37. The system of claim 1 wherein the interface is further configured to allow recordings to be made of the time interactive event.

* * * * *